United States Patent [19]
Alford

[11] Patent Number: 5,129,234
[45] Date of Patent: Jul. 14, 1992

[54] HUMIDITY CONTROL FOR REGULATING COMPRESSOR SPEED

[75] Inventor: Malcolm L. Alford, Euless, Tex.

[73] Assignee: Lennox Industries Inc., Dallas, Tex.

[21] Appl. No.: 641,453

[22] Filed: Jan. 14, 1991

[51] Int. Cl.⁵ ............................................. F25B 49/00
[52] U.S. Cl. ................................. 62/176.6; 62/228.4; F25B/49/00
[58] Field of Search ................ 62/228.4, 176.6, 176.3

[56] References Cited

FOREIGN PATENT DOCUMENTS 0161846 11/1985 European Pat. Off. ........... 62/176.3

*Primary Examiner*—William E. Wayner
*Attorney, Agent, or Firm*—Allegretti & Witcoff, Ltd.

[57] ABSTRACT

A control for regulating relative humidity in an enclosure including a thermostat, a relative humidity sensor, a refrigeration compressor and an air blower. The compressor is run at low or high speeds in response to thermostat demand. Whenever the relative humidity is excessive the compressor low speed control is overridden to effect high compressor speed.

14 Claims, 3 Drawing Sheets

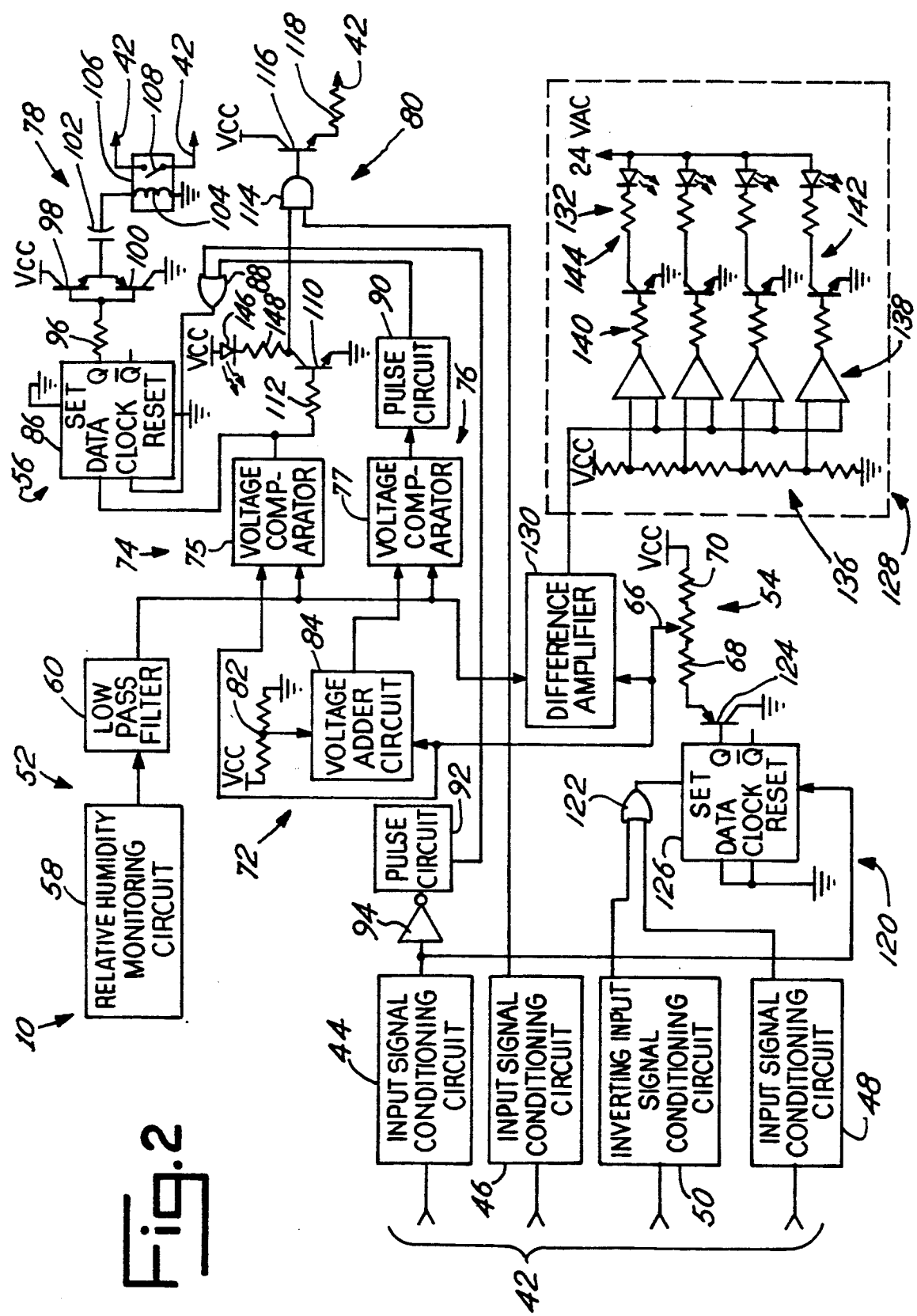

HUMIDITY CONTROL FOR REGULATING COMPRESSOR SPEED

BACKGROUND OF THE INVENTION

The present invention relates generally to an air processing system and more particularly to a control, operating in conjunction with a thermostat and a two-speed compressor, for controlling the relative humidity in an enclosure.

Air processing systems including a thermostat and a two-speed compressor are well known. The compressor may be part of a conventional air conditioner or heat pump. The compressor is cycled ON and OFF and between a LOW and HIGH speed in accordance with the temperature of the enclosure and the thermostatic demand signals, as is well known. HIGH speed operation typically results when the enclosure temperature exceeds the set temperature of the thermostat by an incremental temperature, such as 2° F.

Processed air is delivered to the enclosure by a blower. With a heat pump, the blower typically has two speeds and operates at HIGH speed during cooling and LOW speed during heating, regardless of compressor speed.

The presently available cooling mode humidity controls for incorporation into these types of air processing systems are electromechanical monitors designed solely to control blower speed. Whenever relative humidity of the enclosure exceeds the set point of an electromechanical humidistat, LOW blower speed is maintained. Slower air movement increases dehumidification in the area of the "cold" inside compressor coil.

These electromechanical humidity monitors are inefficient and inexact. While humidity reduction is generally enhanced, the temperature of the enclosure is often not preserved, leading to higher energy costs. Additionally, the relative humidity tolerance of such monitors is much too great to provide adequate control for proper comfort.

SUMMARY OF THE INVENTION

In a principal aspect, the present invention is a humidity control for use in conjunction with a conventional air processing system of the type including a thermostat, blower and air processor, such as a heat pump or an air conditioner. More particularly, the air processor includes a two-speed compressor.

The humidity control is a "slave" to the thermostat, i.e., it is inoperative whenever the temperature demand is met and the air processor is non-functional. Whenever the air processor operates in response to the thermostat, the humidity control monitors relative humidity within the enclosure and manipulates compressor operation to meet the desired dehumidification demand.

The control senses the relative humidity and regulates the level thereof by controlling the compressor speed. The control includes a relative humidity sensor and a humidity level selector, which allows the user to choose the desired relative humidity over a predetermined range, e.q., 40% to 60% relative humidity or "RH".

The control also includes a compressor speed regulator. Whenever actual relative humidity exceeds the set point, the regulator effects HIGH compressor speed, regardless of the thermostatic request based upon enclosure temperature.

It is thus an object of the present invention to provide an improved relative humidity controller. Another object is an inexpensive humidity control device which may be separate from or incorporated into the housing of a conventional room thermostat.

Still another object of the present invention is a relative humidity control which overrides thermostatic demand to provide improved dehumidification without adverse effect upon enclosure temperature. It is also an object to provide a humidity controller which matches compressor speed and humidity demand to enhance the dehumidification process.

It is a further object to provide a humidity control for use in an air processing system which regulates the compressor and blower speeds to provide more efficient humidity regulation. Yet another object of the present invention is a reliable relative humidity control which provides quicker, more accurate and more efficient humidity control.

These and other features, objects and advantages of the present invention are set forth or implicit in the following detailed description of certain preferred embodiments.

BRIEF DESCRIPTION OF THE DRAWING

Preferred embodiments of the present invention are described with reference to the drawing wherein:

FIG. 2 is an electrical schematic block diagram of the present invention shown in FIG. 1;

DETAILED DESCRIPTION OF PREFERRED EMBODIMENTS

Figure 1:
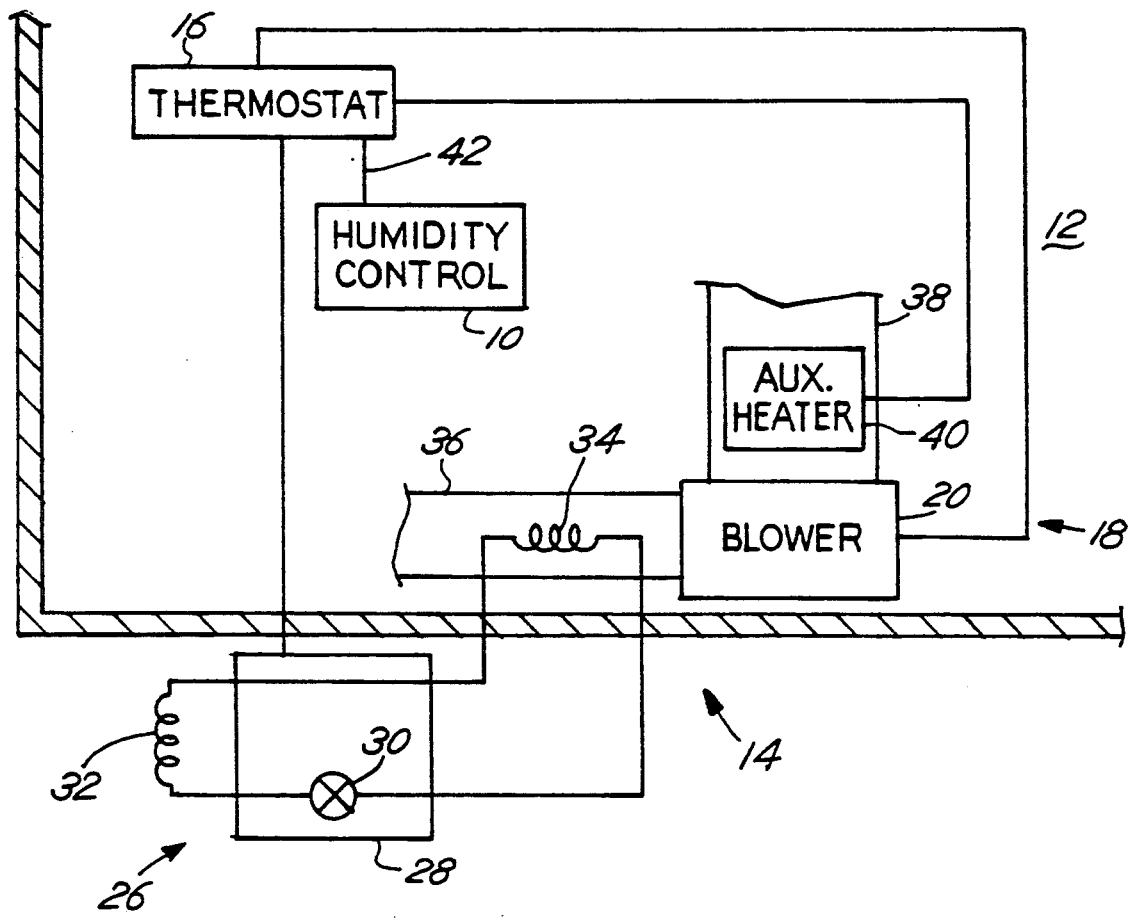
FIG. 1 is a schematic block diagram illustrating the present invention as incorporated into a conventional air processing system.

With reference to the FIGS. 1-4, the present invention is shown as a control 10 for regulating the relative humidity level in an enclosure 12. The control 10 operates in conjunction with, and as a part of, a conventional air processing system 14, including a thermostat 16 and an air processor 18. As is well known, the thermostat 16 is positioned within the enclosure 12 and activates the air processor 18 in accordance with enclosure temperature.

Figure 4:
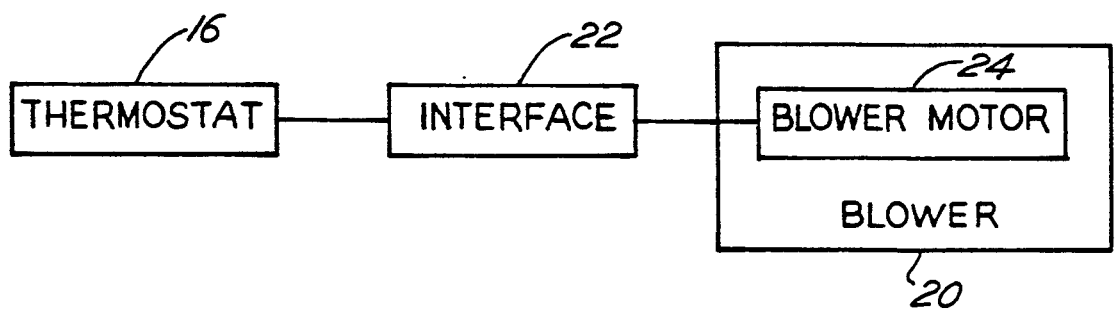
FIG. 4 is a schematic block diagram illustrating a constant volume blower incorporated into the air processing system shown in FIG. 1.

The air processing system 14 further includes a blower 20. A two-speed blower 20 is shown, but the control 10 is readily adapted for use with a constant volume blower such as shown in U.S. Pat. Nos. 4,806,833, 4,540,921, 4,169,990 and 4,005,347. With a constant volume blower 20, an interface 22 between the thermostat 16 and blower motor 24 is necessary as shown in FIG. 4. One such interface 22 is shown in co-pending Ser. No. 07/596,277, filed Oct. 12, 1990, entitled "Interface For Interconnecting A Thermostat And An Electronically Commutated Motor", by the same inventor and assigned to the assignee of this application. The teachings of the aforementioned patents and application are incorporated herein by reference.

The air processor 18 is, in this preferred embodiment, a heat pump 26 including a two-speed compressor 28. The air processor 18 may alternatively include a conventional two-speed air conditioner. The heat pump 26 has a reversing valve 30 for selection of the heating or cooling mode of operation. As is well known, the compressor 28 includes an outside coil 32 and an inside coil 34.

The blower 20 delivers processed air to the enclosure 12 via a supply duct 36 and draws room air via a return duct 38. The inside coil 34 communicates with the supply duct 36.

The thermostat 16 and air processor 18 operate in a conventional fashion to heat or cool the enclosure 12. In summer, the thermostat 16 activates first stage or LOW speed cooling whenever the enclosure temperature exceeds the thermostatic set point manually selected by the user, (e.g., 74° F.). First stage cooling, the response to a first stage cooling signal, is achieved at HIGH blower speed and LOW compressor speed. Should the enclosure temperature exceed a second set point, based upon the manually selected set point (e.q., 76° F.), then a second stage cooling demand signal is issued by the thermostat 16. This results in HIGH blower speed and HIGH compressor speed.

As is well known, winter operation is similar. The reversing valve 30 is activated to provide a "hot" inside coil 34. The second set point in this mode of operation represents a temperature below the manually selected set point, and periodically the heat pump 26 is switched to the cooling mode to avoid freezing of the outside coil 32. During heating, the blower 20 is operated at a LOW speed, regardless of temperature demand.

As is well known, the operation of the blower 20 and heat pump 26 is controlled by a series of sinusoidal demand signals, 24 VAC, from the thermostat 16. The demand signals include: (i) first stage demand signal, often referred to as the "M" signal; (ii) second stage demand signal, often referred to as the "M2" signal; and (iii) a reversing valve signal, often referred to as the "RV" signal. In this preferred embodiment, the thermostat 16 also issues an auxiliary heat signal, often referred to as the "Y" signal, to activate a supplemental electric heater 40.

As is well known, the compressor 28 is cycled ON and OFF by the thermostat 16. The air processor 18 provides the most efficient, i.e., least costly, cooling at LOW compressor speed and HIGH blower speed.

Referring now to FIGS. 1 and 2, the control 10 is shown as a part of this conventional system 14. The control 10 is a "slave" to the thermostat 16 in that the control 10 is non-functional (except for display purposes as described herein) whenever the thermostatic temperature demand is fully met. Whenever the air processor 18 is activated, however, the control 10, in response to relative humidity demand, manipulates operation of the compressor 28 to provide enhanced dehumidification. The control 10 actually overrides the thermostatic demand whenever the humidity demand is unsatisfied.

As best shown in FIG. 1, the control 10 is coupled to the thermostat 16 by a multi-wire conductor 42. The control 10 receives, in this preferred embodiment, the first stage demand, second stage demand, reversing valve and auxiliary heat signals via the conductor 42. Referring now to FIG. 2, the first stage demand, second stage demand and auxiliary heat signals are received by input signal conditioning circuits 44, 46, 48, respectively. The reversing valve signal is, in this preferred embodiment, a 24 VAC signal during the cooling mode of compressor operation, and it is transformed and inverted by a conventional inverting input signal conditioning circuit 50.

The circuits 44, 46, 48, 50 are conventional and convert the 24 VAC thermostatic signals into appropriate digital DC signals. Each circuit 44, 46, 48, 50 has a large amount of hysteresis to substantially avoid oscillation problems. Surge protection is also desirable.

Referring again to FIG. 2, the control 10 includes, in this preferred embodiment, sensor means 52, selector means 54, and compressor control means 56. The sensor means 52 senses actual relative humidity within the enclosure 12. The sensor means 52 includes a bulk polymer electronic relative humidity monitor 58 connected to a low pass filter 60. The output of the monitor 58 is a DC voltage ranging from 2 to 12 volts, proportionately representing 40% to 60% relative humidity. The filter 60 appropriately shapes the DC voltage such that the sensor means 52 provides a slow-changing, substantially noise-free relative humidity signal.

Figure 3:
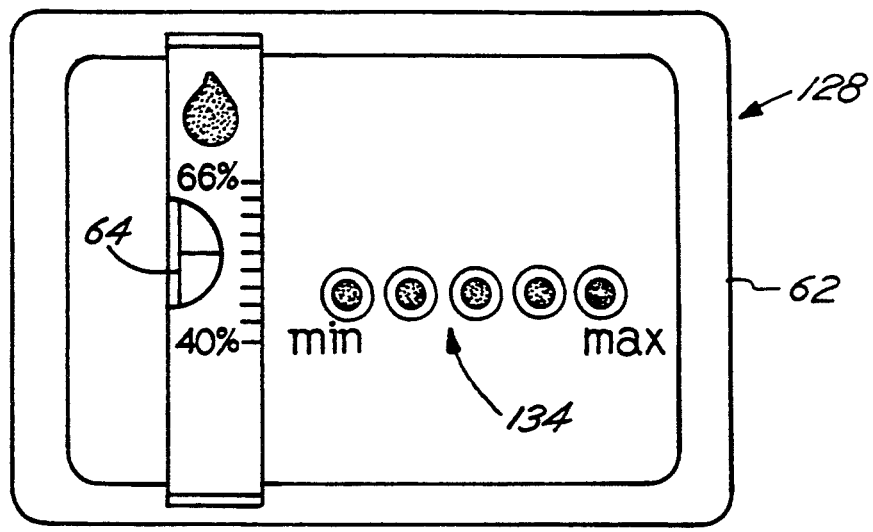
FIG. 3 is a front view of a housing for the present invention, illustrating the relative humidity selector to be set by the user.

The selector means 54 is manually adjusted to select the desired relative humidity level within the enclosure 12. Referring now to FIG. 3, the control 10 is incorporated into a housing 62, separate from the thermostat 16. The selector means 54 includes a slide 64 on the housing 62, which is manually set to a humidity level between 40% and 60%. The control 10 may alternatively be incorporated within the housing (not shown) of the thermostat 16.

The selector means 54 further includes potentiometer 66, set by the slide 64, such that the selector means 54 provides a DC set point signal representing a desired relative humidity level. As shown in FIG. 2, the potentiometer 66 interposes two resistors 68, 70. The resistor 70 is connected to a control power supply, designated Vcc and preferably 15 VDC.

The compressor control means 56 is coupled and responsive to the sensor means 52 and selector means 54. The compressor control means 56 effects HIGH speed compressor operation under predetermined conditions to provide enhanced dehumidification and improved comfort.

In this preferred embodiment, the compressor control means 56 causes HIGH compressor speed during a given ON cycle of a first stage cooling demand. Whenever actual relative humidity exceeds the desired humidity level at the conclusion of an ON cycle of the compressor 28, then the compressor control means 56 effects HIGH compressor speed during the next ON cycle, regardless of temperature demand. The compressor control means 56 overrides the thermostatic demand and effectively converts any first stage demand signal, as issued by the thermostat 16, to a second stage demand signal, thereby causing HIGH speed compressor operation and enhanced dehumidification.

In this preferred embodiment, the compressor control means 56 also immediately forces HIGH compressor speed during any ON cycle, regardless of temperature demand, whenever actual relative humidity within the enclosure 12 exceeds a relative humidity threshold above the desired relative humidity level. This threshold is established by the compressor control means 56 based upon the set point signal received from the selector means 54. HIGH compressor speed is maintained until the relative humidity falls below the threshold or until the compressor 28 is cycled OFF by the thermostat 14, whichever occurs first.

The compressor control means 56 includes adjustment means 72, first comparator means 74, second comparator means 76, override means 78 and blower control means 80. The adjustment means 72 is coupled to the selector means 54 and receives the set point signal. Its output is an adjusted signal, representing a relative humidity which exceeds the set point relative humidity by a predetermined increment (e.g., 2%) and defines the relative humidity threshold. In this preferred embodiment, the adjustment means 72 includes a voltage divider circuit 82, interconnecting the supply Vcc and ground and providing the appropriate DC voltage increment, and a voltage adder circuit 84. The voltage adder circuit 84 receives, as inputs, the set point signal and the voltage increment and responsively outputs the adjusted signal.

The first comparator means 74 is coupled to the sensor means 52 and the selector means 54 to receive the relative humidity signal and the set point signal thereof, respectively. The first comparator means 74 responsively provides a first, HIGH comparator signal whenever dehumidification is necessary. A HIGH output is issued whenever actual relative humidity exceeds that selected by the user as established by the set point signal. In this preferred embodiment, the first comparator means 74 is a conventional comparator 75 with hysteresis to substantially avoid oscillation of the output signal.

The second comparator means 76 is coupled to receive the relative humidity signal and the adjusted signal. Its output is a second, HIGH comparator signal whenever the enclosure humidity exceeds the threshold established by the adjusted signal. The second, HIGH comparator signal represents a need and demand for immediate dehumidification. The second comparator means 76 is also a conventional comparator 77 designed with hysteresis.

The override means 78 is coupled to the thermostat 16, the first comparator means 74 and the second comparator means 76. Its inputs are the first stage demand or M signal, the first comparator signal and the second comparator signal. Responsively, the override means 78 issues an output signal which governs the compressor speed, regardless of thermostatic temperature demand and in accordance with humidity demand.

Referring again to FIG. 2, the override means 78 includes a D flip-flop 86, with its data input connected to the first comparator means 74 and its clock input connected to the output of an OR gate 88. The inputs of the OR gate 88 are connected to a first pulse circuit 90 and a second pulse circuit 92, respectively. The first pulse circuit 90 interposes the second comparator means 76 and the OR gate 88 and converts the adjusted signal into a short duration pulse for toggling the flip-flop 86. The second pulse circuit 92 is connected to an inverter 94 which receives and inverts the first stage demand signal from the thermostat 16. The second pulse circuit 92 converts this inverted M signal into an appropriate short duration toggling pulse.

The Q output of the D flip-flop 86 is coupled, through a resistor 96, to the bases of two transistors 98, 100, respectively. The collector of the NPN transistor 98 is connected to the supply Vcc and the emitter of the PNP transistor 100 is grounded. The emitter of the transistor 98 and the collector of the transistor 100 are interconnected. Whenever the Q output is HIGH, the transistor 98 conducts; whenever the Q output is LOW, the transistor 100 conducts.

The emitter/collector junction between the transistors 98, 100 is connected to a capacitor 102 which is, in turn, connected to the coil 104 of a relay 106. The switch 108 of the relay 106 interposes the first stage demand and second stage demand terminals of the thermostat 16 via the multi-wire conductor 42, shorting those terminals upon energization of the coil 104. Closing of the switch 108 forces the compressor 28 to HIGH speed, regardless of thermostatic temperature demand. When the transistor 98 conducts, the coil 104 is energized through charging of the capacitor 102. Discharge of the capacitor 102 occurs whenever the transistor 100 conducts.

In this preferred embodiment, whenever actual relative humidity exceeds the desired level, the data input of the D flip-flop 86 is set HIGH. The Q output remains LOW, and the compressor 28 operates at LOW speed until the clock input is toggled (i) by the second comparator signal (i.e., whenever the actual relative humidity exceeds the threshold established by the adjustment means (72) or (ii) by the inversion of first stage demand signal (i.e., whenever the thermostat 16 cycles OFF the compressor 28). When the Q output goes HIGH, the capacitor 102 is charged. The relay 106 remains activated until the first comparator signal goes LOW, representing satisfaction of the dehumidification demand.

In general operational terms, the control 10 permits LOW speed compressor operation under supervision of the thermostat 16 unless (i) humidity rises above the humidity threshold defined by the adjustment means 72 or (ii) the compressor 28 cycles OFF before actual relative humidity is reduced to the desired level. The first event triggers immediate HIGH speed operation of the compressor 28; the second triggers HIGH speed beginning with the next ON cycle and continuing until the first comparator signal goes LOW and the humidity demand is met.

The blower control means 80 is coupled to receive the second stage demand signal from the thermostat 16 and an inversion of the first comparator signal from the first comparator means 74. As shown in FIG. 2, the blower control means 80 includes a transistor 110, and the base thereof is connected through a resistor 112 to the output of the first comparator means 74. The NPN transistor 110 is utilized to invert the first comparator signal for delivery to one input of an AND gate 114. The other input of the AND gate 114 receives the second stage demand signal.

The output of the AND gate 114 is connected to and controls the state of a transistor 116. The collector of the NPN transistor 116 is connected to the supply Vcc, and the emitter is connected through a resistor 118 to the conductor 42. The transistor 116 conducts whenever (i) second stage cooling is demanded by the thermostat 16 or forced by the control 10 and (ii) the dehumidification demand is fully met (i.e., the first comparator signal is LOW representing an actual relative humidity below the level set by the selector means 54). Whenever the transistor 116 is conductive, the blower 20 operates at HIGH speed.

Should the output of the first comparator means 74 reflect a demand, then the transistor 116 is rendered non-conductive and the blower 20 is switched to LOW speed. This is accomplished via the conductor 42, through the resistor 118, the thermostat 16 and, where necessary, the interface 22. The combination of HIGH compressor speed and LOW blower speed provides maximum dehumidification.

In this preferred embodiment, the control 10 further includes disable means 120. The control 10 is disabled during operation of the heat pump 26 in the heating mode, and the disable means 120 effectively de-activates the control 10 whenever the thermostat 16 issues a reversing valve signal or an auxiliary heat signal. In this preferred embodiment, the reversing valve signal results in a LOW output from the conditioning circuit 50.

The disable means 120 preferably includes an OR gate 122 coupled to the thermostat 16 through the conditioning circuits 48, 50; a transistor 124 coupled to the selector means 54; and a D flip-flop 126 coupled to the thermostat 26 through the conditioning circuit 44, the OR gate 122 and the PNP transistor 124. The OR gate 122 provides a HIGH signal at the SET input of the D flip-flop 126 whenever heating is sought, as represented by a reversing valve signal or an auxiliary heat signal. The DATA and CLOCK inputs of the D flip-flop 126 are grounded, such that the Q output connected to the base of the transistor 124 is controlled by the RESET input, which is connected to receive the first stage demand signal from the thermostat 16.

During cooling, the output of the conditioning circuit 50, in response to the reversing valve signal, is HIGH and the auxiliary heat signal is LOW, such that the SET input of the D flip-flop 126 is LOW. The Q output is toggled LOW in response to a first stage cooling demand and the transistor 124 conducts. Whenever the transistor 124 is conductive, the set point of the selector means 54 is established by the potentiometer 66, enabling the control 10. This condition holds until the SET input of the flip-flop 126 is toggled.

During heating, the reversing valve signal switches states: both the reversing valve and auxiliary heat signals switch during defrost. In either event, the Q output of the D flip-flop 126 goes HIGH, rendering the transistor 124 non-conductive. This effectively de-activates the control 10, or more particularly the selector means 54, by establishing a very high set point voltage.

This preferred embodiment of the present invention also includes display means 128. Referring to FIGS. 2 and 3, the display means 128 visually displays the operational state of the control 10, showing whether the control 10 is indeed operative and further showing the level of demand.

The display means 128 includes a difference amplifier 130, coupled to the sensor means 52 and the selector means 54, and a series of light-emitting diodes 132, visible through colored lens 134 arranged in a bar graph configuration on the housing 62. The display means 128 further includes a voltage divider circuit 136 and a series of comparators 138. Each comparator 138 receives the output of the difference amplifier 130 at one input and one voltage from the divider circuit 136 at the other input. The comparator outputs are connected, respectively, through a series of resistors 140 to the bases of a series of transistors 142. The diodes 132 are connected, respectively, to the collectors of the transistors 142 through a series of resistors 144 and to the supply Vcc. The output of the difference amplifier 130 is a DC voltage proportional to the difference between actual relative humidity within the enclosure 12 and the desired humidity level. The voltage divider circuit 136 provides a series of DC voltages for comparison purposes, such that the number of comparators 138 issuing a HIGH output represents the extent or degree of dehumidification demand. A HIGH output from any comparator 138 causes illumination of the corresponding diode 132 by rendering the corresponding transistor 142 conductive.

In addition, the display means 128 includes a light-emitting diode 146, connected through a resistor 148, to the collector of the transistor 110. The diode 146 illuminates a lens 134 whenever the control 10 is operative, and when this single diode 146 is lit, the dehumidification demand is at a minimum.

Figure 5:
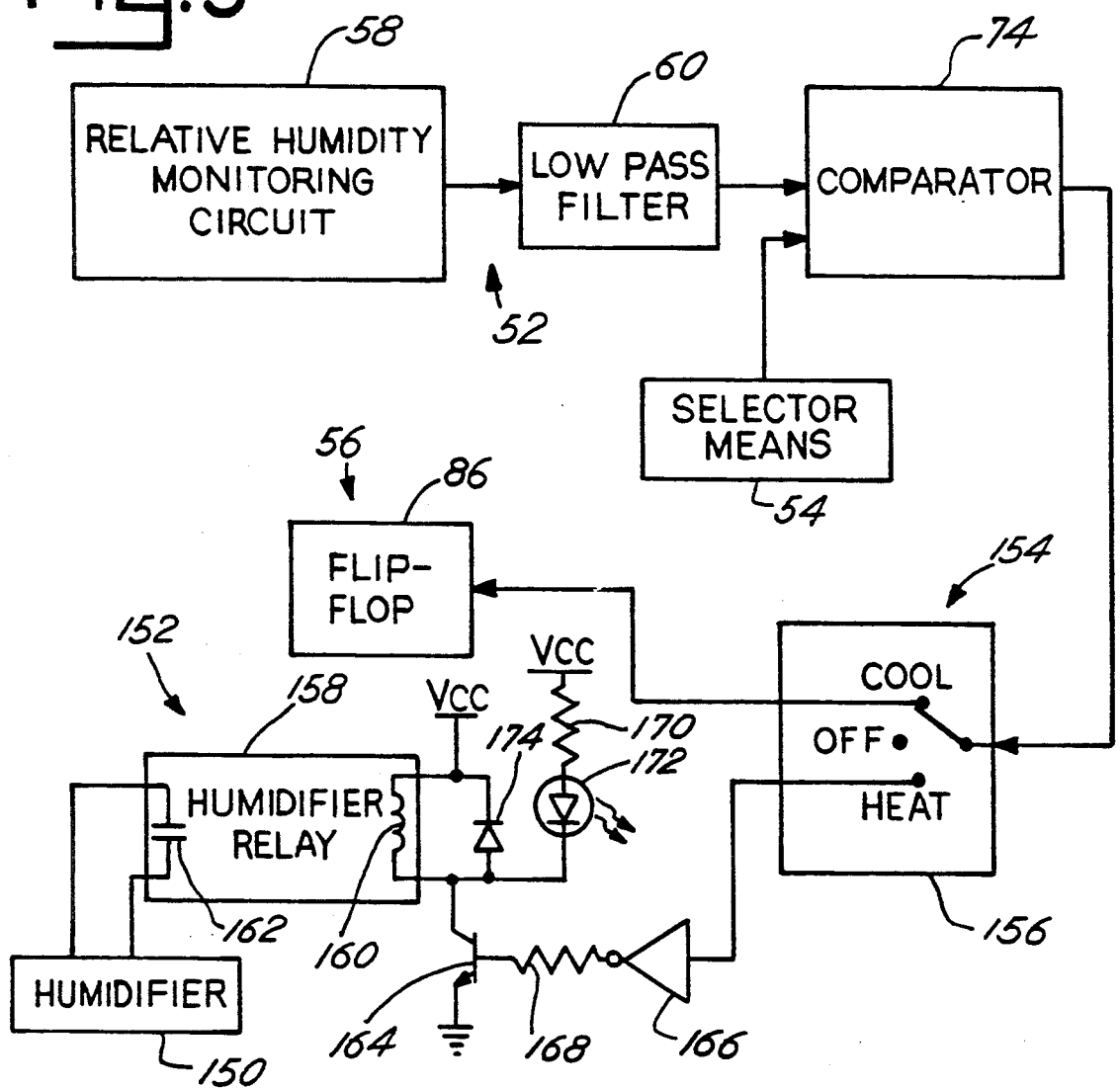
FIG. 5 is a partial schematic block diagram of the present invention shown in FIGS. 1 and 2 incorporated into an air processing system including a humidifier operative during heating.

Another preferred embodiment of the present invention is shown schematically in FIG. 5. Here the air processing system 14 includes a conventional humidifier 150 for use during heating of the enclosure 12. The humidifier 150 is activated by the control 10 whenever the enclosure humidity level falls below the desired level, as set by the user.

In this preferred embodiment, the control 10 includes humidifier control mean 152 for activating the humidifier 150 in response to the sensor means 52 and the selector means 54 and directive means 154 for selectively enabling and disabling the compressor control means 56 and the humidifier control means 152. The directive means 154 includes a mode switch 156, preferably mounted on the housing 62, having three positions, i.e., "OFF", "COOL" and "HEAT".

The humidifier control means 152 includes a humidifier relay 158, having a coil 160 and switch 162. Whenever the coil 160 is energized, the switch 162 closes to activate the humidifier 150. The coil 160 is connected to the collector of a transistor 164 and to the power supply Vcc.

The base of the NPN transistor 164 is connected to the "HEAT" terminal of the mode switch 156 through an inverter 166 and a resistor 168. The collector of the transistor 164 is also connected to the power supply, Vcc, through a resistor 170 and light-emitting diode 172, which is preferably visible through a lens 134 on the housing 62. A diode 174, interconnecting the supply Vcc and collector of the transistor 164, provides current protection.

Various preferred embodiments of the present invention have been described. It is to be understood, however, that changes and modifications can be made without departing from the true scope and spirit of the present invention as defined by the following claims, which are to be interpreted in view of the foregoing.

What is claimed is:

1. A control for regulating humidity in an enclosure to be used in conjunction with an air processing system, including a thermostat, an air processor and a blower, for providing processed air to said enclosure; said thermostat providing, under predetermined conditions, a first stage cooling demand signal and a second stage cooling demand signal; said air processor including a compressor operable in a cooling mode, in an ON cycle and an OFF cycle, and at a low compressor speed and a high compressor speed in response to said thermostat; comprising, in combination:

sensor means for sensing actual relative humidity within said enclosure and providing a relative humidity signal;

selector means for selecting a desired relative humidity level within said enclosure and providing a set point signal; and compressor control means, coupled and responsive to said thermostat, said sensor means and said selector means, for overriding said first stage cooling demand signal and effecting said high compressor speed in a predetermined ON cycle of said compressor whenever actual relative humidity within said enclosure exceeds said desired relative humidity level, said compressor control means including:

adjustment means, coupled to said selector means, for receiving said set point signal and for responsively providing an adjusted signal corresponding to a relative humidity threshold exceeding said desired relative humidity by a predetermined increment first comparator means, coupled to said sensor means and said selector means, for receiving said relative humidity signal and said set point signal and for responsively providing a first comparator signal whenever actual relative humidity exceeds desired relative humidity level;

second comparator means, coupled to said sensor means and said adjustment means, for receiving said relative humidity signal and said adjusted signal and for responsively providing a second comparator signal whenever actual relative humidity exceeds said relative humidity threshold; and override means, coupled to said thermostat, said first comparator means and said second comparator means, for receiving said first stage demand signal, said first comparator signal and said second comparator signal and for responsively effecting said high compressor speed.

2. A control as claimed in claim 1 wherein said compressor control means overrides whenever said desired relative humidity level is exceeded during a compressor cycle prior to said predetermined ON cycle.

3. A control as claimed in claim 1 or 2 wherein said compressor control means establishes a relative humidity threshold above said desired relative humidity level in response to said set point signal, said compressor control means overriding said first stage cooling demand signal and effecting said high compressor speed during said ON cycle whenever said actual relative humidity exceeds said relative humidity threshold.

4. A control for regulating humidity in an enclosure to be used in conjunction with an air processing system, including a thermostat, an air processor and a blower, for providing processed air to said enclosure; said thermostat providing, under predetermined conditions, a first stage cooling demand signal, a second stage cooling demand signal, and a reversing valve signal; said air processor including a compressor operable in a cooling and heating mode, in an ON cycle and an OFF cycle, and at a low compressor speed and a high compressor speed in response to said thermostat; comprising, in combination:

sensor means for sensing actual relative humidity within said enclosure and providing a relative humidity signal;

selector means for selecting a desired relative humidity level within said enclosure and providing a set point signal;

compressor control means, coupled and responsive to said thermostat, said sensor means and said selector means, for overriding said first stage cooling demand signal and effecting said high compressor speed in a predetermined ON cycle of said compressor whenever actual relative humidity within said enclosure exceeds said desired relative humidity level; and disable means, coupled and responsive to said thermostat, for disabling said control during said heating mode.

5. A control as claimed in claim 4 wherein said compressor control means overrides whenever said desired relative humidity level is exceeded during a compressor cycle prior to said predetermined ON cycle.

6. A control as claimed in claim 4 or 5 wherein said disable means further includes a flip-flop coupled to said thermostat, said controllably conductive means including a transistor coupled to said sensor means and controlled by said flip-flop.

7. A control as claimed in claim 4 or 5 wherein said disable means includes controllably conductive means, coupled to said sensor means, for disabling said sensor means during said heating mode.

8. A control for regulating humidity in an enclosure to be used in conjunction with an air processing system, including a thermostat, an air processor and a blower, for providing processed air to said enclosure; said thermostat providing, under predetermined conditions, a first stage cooling demand signal and a second stage cooling demand signal; said air processor including a compressor operable in a cooling mode, in an ON cycle and an OFF cycle, and at a low compressor speed and a high compressor speed in response to said thermostat; said blower having a first speed during said cooling mode and a second speed below said first speed; comprising, in combination:

sensor means for sensing actual relative humidity within said enclosure and providing a relative humidity signal;

selector means for selecting a desired relative humidity level within said enclosure and providing a set point signal;

compressor control means, coupled and responsive to said thermostat, said sensor means and said selector means, for overriding said first stage cooling demand signal and effecting said high compressor speed in a predetermined ON cycle of said compressor whenever actual relative humidity within said enclosure exceeds said desired relative humidity level; and blower control means, coupled and responsive to said thermostat and said compressor control means, for overriding said first and second stage cooling demand signals and effecting said second speed whenever said actual relative humidity exceeds said desired relative humidity level.

9. A control as claimed in claim 8 wherein said compressor control means overrides whenever said desired relative humidity level is exceeded during a compressor cycle prior to said predetermined ON cycle.

10. A control as claimed in claim 8 or 9 wherein said compressor control means includes:

adjustment means, coupled to said selector means, for receiving said set point signal and for responsively providing an adjusted signal corresponding to a relative humidity threshold exceeding said desired relative humidity by a predetermined increment;

first comparator means, coupled to said sensor means and said selector means, for receiving said relative humidity signal and said set point signal and for responsively providing a first comparator signal whenever actual relative humidity exceeds desired relative humidity level;

second comparator means, coupled to said sensor means and said adjustment means, for receiving said relative humidity signal and said adjusted signal and for responsively providing a second comparator signal whenever actual relative humidity exceeds said relative humidity threshold; and override means, coupled to said thermostat, said first comparator means and said second comparator means, for receiving said first stage demand signal, said first comparator signal and said second comparator signal and for responsively effecting high compressor speed.

11. A control for regulating humidity in an enclosure to be used in conjunction with an air processing system, including a thermostat, an air processor, a humidifier and a blower, for providing processed air to said enclosure; said thermostat providing, under predetermined conditions, a first stage cooling demand signal and a second stage cooling demand signal; said air processor including a compressor operable in a cooling mode, in an ON cycle and an OFF cycle, and at a low compressor speed and a high compressor speed in response to said thermostat; comprising, in combination:

sensor means for sensing actual relative humidity within said enclosure and providing a relative humidity signal;

selector means for selecting a desired relative humidity level within said enclosure and providing a set point signal;

compressor control means, coupled and responsive to said thermostat, said sensor means and said selector means, for overriding said first stage cooling demand signal and effecting said high compressor speed in a predetermined ON cycle of said compressor whenever actual relative humidity within said enclosure exceeds said desired relative humidity level;

humidifier control means, coupled and responsive to said sensor means and said selector means, for activating said humidifier whenever said actual relative humidity is below said desired relative humidity level; and directive means for selectively enabling and disabling said compressor control means and said humidifier control means.

12. A control as claimed in claim 11 wherein said compressor control means overrides whenever said desired relative humidity level is exceeded during a compressor cycle prior to said predetermined ON cycle.

13. A control as claimed in claim 12 wherein said compressor control means establishes a humidity threshold above said desired relative humidity level in response to said set point signal, said compressor control means overriding said first stage cooling demand signal and effecting said high compressor speed during said ON cycle whenever said actual relative humidity exceeds said humidity threshold.

14. A control as claimed in claim 13 wherein said compressor control means includes:

adjustment means, coupled to said selector means, for receiving said set point signal and for responsively providing an adjusted signal corresponding to said relative humidity threshold;

first comparator means, coupled to said sensor means and said selector means, for receiving said relative humidity signal and said set point signal and for responsively providing a first comparator signal whenever actual relative humidity exceeds desired relative humidity level;

second comparator means, coupled to said sensor means and said adjustment means, for receiving said relative humidity signal and said adjusted signal and for responsively providing a second comparator signal whenever actual relative humidity exceeds said relative humidity threshold; and override means, coupled to said thermostat, said first comparator means and said second comparator means, for receiving said first stage demand signal, said first comparator signal and said second comparator signal and for responsively effecting said high compressor speed.

* * * * *